US012434154B2

(12) United States Patent
Fan

(10) Patent No.: US 12,434,154 B2
(45) Date of Patent: *Oct. 7, 2025

(54) VIRTUAL ITEM MOVEMENT CONTROL METHOD, TERMINAL, AND STORAGE MEDIUM

(71) Applicant: Tencent Technology (Shenzhen) Company Limited, Shenzhen (CN)

(72) Inventor: Yourui Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 85 days.

This patent is subject to a terminal disclaimer.

(21) Appl. No.: 18/226,124

(22) Filed: Jul. 25, 2023

(65) Prior Publication Data

US 2023/0364519 A1 Nov. 16, 2023

Related U.S. Application Data

(63) Continuation of application No. 17/016,150, filed on Sep. 9, 2020, now Pat. No. 11,752,439, which is a (Continued)

(30) Foreign Application Priority Data

Aug. 2, 2018 (CN) ......................... 201810870486.2

(51) Int. Cl.
*A63F 13/00* (2014.01)
*A63F 13/58* (2014.01)
*A63F 13/837* (2014.01)

(52) U.S. Cl.
CPC ............ *A63F 13/837* (2014.09); *A63F 13/58* (2014.09); *A63F 2300/8076* (2013.01)

(58) Field of Classification Search
CPC .......... A63F 13/40; A63F 13/23; A63F 13/69; A63F 13/609
See application file for complete search history.

(56) References Cited

U.S. PATENT DOCUMENTS 8,996,024 B1 3/2015 Teller et al.
10,512,845 B2 * 12/2019 Chai ...................... A63F 13/58
(Continued)

FOREIGN PATENT DOCUMENTS

CN 101615301 A 12/2009
CN 102693362 A 9/2012
(Continued)

OTHER PUBLICATIONS

The Division 2 (Year: 2019).*
(Continued)

*Primary Examiner* — David L Lewis
*Assistant Examiner* — Eric M Thomas
(74) *Attorney, Agent, or Firm* — Morgan, Lewis & Bockius LLP

(57) ABSTRACT

This application discloses a virtual item movement control method performed at a computing device. The computing device displays a target virtual item to descend in a virtual scene. After determining an initial movement track of the target virtual item according to a first display position and a first speed of the target virtual item, the computing device updates, in real time, the initial movement track of the target virtual item according to at least one of a randomly-determined environmental condition of the virtual scene and a health value of the target virtual item to obtain a target movement track and then controls the target virtual item to move according to the target movement track until after the target virtual item arrives at a stationary position in the virtual scene.

20 Claims, 10 Drawing Sheets

Related U.S. Application Data continuation of application No. PCT/CN2019/092229, filed on Jun. 21, 2019.

(56) References Cited

U.S. PATENT DOCUMENTS

| | | | | |
|---|---|---|---|---|
| 11,752,439 | B2 | 9/2023 | Fan | |
| 2015/0084281 | A1 | 3/2015 | Miller | |
| 2018/0078858 | A1* | 3/2018 | Chai | A63F 13/216 |

FOREIGN PATENT DOCUMENTS

| | | | |
|---|---|---|---|
| CN | 105260508 | A | 1/2016 |
| CN | 106440948 | A | 2/2017 |
| CN | 107998654 | A | 5/2018 |
| CN | 108037827 | A | 5/2018 |
| CN | 108269309 | A | 7/2018 |
| CN | 109107154 | A | 1/2019 |

OTHER PUBLICATIONS

Ali-A, “Legendary Supply Drops in Fortnite: Battle Royale!”, YouTube, Dec. 15, 2017, 3 pgs., Retrieved from the Internet: https://youtu.be/5GrPOSzw17Y.

“PlayerUnknown’s Battlegrounds Airdrop Materials and Laws”, May 23, 2018, Retrieved from the Internet: https://jingvan.baidu.com/article/adc81513ade5341723bf7302.html.

Tencent Technology, ISRWO, PCT/CN2019/092229, Aug. 27, 2019, 8 pgs.

Tencent Technology, IPRP, PCT/CN2019/092229, Feb. 2, 2021, 6 pgs.

* cited by examiner

VIRTUAL ITEM MOVEMENT CONTROL METHOD, TERMINAL, AND STORAGE MEDIUM

CROSS REFERENCE TO RELATED APPLICATIONS

This application is a continuation application of U.S. patent application Ser. No. 17/016,150, entitled "VIRTUAL ITEM MOVEMENT CONTROL METHOD, TERMINAL, AND STORAGE MEDIUM" filed on Sep. 9, 2020, which is a continuation application of PCT Patent Application No. PCT/CN2019/092229, entitled "METHOD FOR CONTROLLING MOVEMENT OF VIRTUAL PROP, TERMINAL, AND STORAGE MEDIUM" filed on Jun. 21, 2019, which claims priority to Chinese Patent Application No. 201810870486.2, entitled "VIRTUAL ITEM MOVEMENT CONTROL METHOD AND APPARATUS, ELECTRONIC DEVICE, AND STORAGE MEDIUM" filed on Aug. 2, 2018, all of which are incorporated by reference in their entirety.

FIELD OF THE TECHNOLOGY

This application relates to the field of computer technologies, and in particular, to a virtual item movement control method, a terminal, and a storage medium.

BACKGROUND OF THE DISCLOSURE

With the development of computer technologies and the diversification of terminal functionalities, more types of games can be played on terminals. Shooting game is a type of popular game. A terminal may display a virtual scene in an interface, and display a virtual object in the virtual scene. A user may control the virtual object to pick up a virtual item in the virtual scene, and control the virtual object to use the virtual item to fight against another virtual object.

There is also a rare virtual item in this type of game, which is usually dropped during the game. At present, a movement control method for this virtual item is usually as follows: The virtual item is generated at a fixed time interval, and has a fixed route and a fixed landing point. The landing point is usually a point on the fixed route. Generally, a plane may carry this virtual item and fly along the fixed route. When arriving at the landing point, the virtual item may be landed vertically to a fixed position. Moreover, the virtual item cannot move at the fixed position.

In the virtual item movement control method, the virtual item can move according to the fixed route only, the landing point of the virtual item is pre-generated and does not change, and the position of the virtual item cannot be changed once the virtual item is landed. Since an environmental condition of the virtual scene and interaction between the virtual item and a virtual object or another virtual item are not considered, neither a real scene in which a flying object may change a route with an environmental condition can be realistically simulated, nor a real scene in which an object moves with external force exerted by a human being can be realistically simulated. Consequently, the virtual item movement control method has a low display efficiency and a poor display effect.

SUMMARY

According to embodiments provided in this application, a virtual item movement control method, a terminal, and a storage medium are provided.

According to a first aspect, a virtual item movement control method is provided at a terminal having a processor and memory storing a plurality of programs to be executed by the processor, including:

- displaying, by the terminal, a target virtual item in a virtual scene, the target virtual item including a flying virtual item and a carrier virtual item, and the flying virtual item being used for hanging the carrier virtual item to descend in the virtual scene;
- determining, by the terminal, a target movement track of the target virtual item according to a first display position and a first speed of the target virtual item and at least one of an environmental condition of the virtual scene and a health value of the flying virtual item; and
- controlling, by the terminal, the target virtual item to move in the virtual scene according to the target movement track.

In some embodiments, the virtual item movement control method further includes:

- obtaining, by the terminal, a second display position and a second speed of the carrier virtual item in a case that it is determined that the carrier virtual item is in a landed state;
- determining, by the terminal, a second target movement track of the carrier virtual item according to the second display position, the second speed, and at least one of a terrain on which the carrier virtual item is located and interaction between the carrier virtual item and a virtual object or a virtual vehicle in the virtual scene; and
- controlling, by the terminal, the carrier virtual item to move in the virtual scene according to the second target movement track.

According to a second aspect, a terminal is provided, including a memory and a processor, the memory storing a plurality of programs, the plurality of programs, when executed by the processor, causing the processor to perform the aforementioned virtual item movement control method.

According to a third aspect, a non-transitory computer-readable storage medium is provided, storing a plurality of programs, the plurality of programs, when executed by a processor of a terminal, causing the terminal to perform the aforementioned virtual item movement control method.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
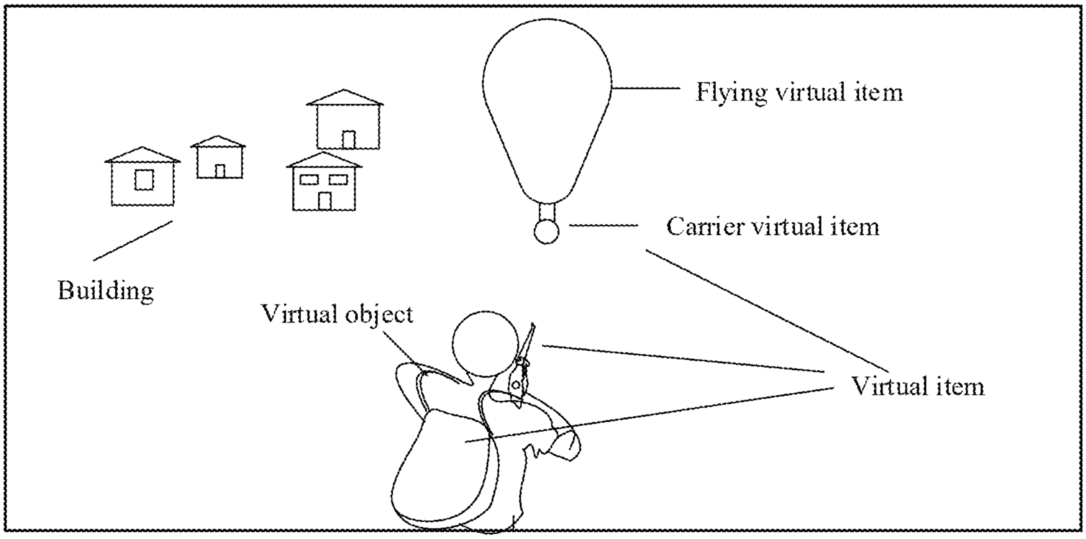
FIG. 1 is a schematic diagram of a terminal interface according to an embodiment of this application.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

To make objectives, technical solutions, and advantages of this application clearer and more comprehensible, the following further describes this application in detail with reference to the accompanying drawings and embodiments. It is to be understood that the specific embodiments described herein are merely used for explaining this application but are not intended to limit this application.

The embodiments of this application are mainly related to a video game or simulated training scenario. For example, in the video game scenario, a user may operate on a terminal in advance, so that the terminal may download a game configuration file of a video game after detecting the operation of the user. The game configuration file may include an application program, interface display data, virtual scene data, and the like of the video game. The user may invoke the game configuration file when logging in to the video game on the terminal, to render and display an interface of the video game. The user may perform a touch operation on the terminal. After detecting the touch operation, the terminal may determine game data corresponding to the touch operation, and perform rendering and displaying based on the game data. The game data may include virtual scene data, behavioral data of a virtual object in a virtual scene, and the like.

The virtual scene involved in this application may be used for simulating a three-dimensional virtual space or a two-dimensional virtual space, which may be an open space. The virtual scene may be used for simulating a real environment in reality. For example, the virtual scene may include sky, land, and ocean, and the land may include environmental elements such as a desert and a city. A user may control a virtual object to move in the virtual scene. The virtual object may be an avatar for representing the user in the virtual scene. The avatar may be in any form such as a human being or an animal, which is not limited in this application. The virtual scene may include a plurality of virtual objects. Each virtual object has a respective shape and size in the virtual scene, and occupies a part of space in the virtual scene.

For example, in a shooting game, the user may control the virtual object to descend freely, glide, parachute, or the like in the sky of the virtual scene, or run, jump, crawl, stoop to move forward, or the like on the land, or swim, float, dive, or the like in the ocean. Certainly, the user may alternatively control the virtual object to drive a virtual vehicle to move in the virtual scene. Herein, the foregoing scene is merely used as an example for description, which is not specifically limited in the embodiments of this application. The user may alternatively control the virtual object to use a weapon to fight against another virtual object. The weapon may be a cold weapon or a hot weapon, which is not specifically limited in this application.

The user may alternatively control the virtual object to get in and out of a building in the virtual scene, discover and pick up a virtual item in the virtual scene, and use the picked virtual item to fight against another virtual object. For example, the virtual item may be clothing, a helmet, a bulletproof vest, a medical product, a cold weapon, or a hot weapon, or may be a virtual item left after another virtual object is eliminated. Certainly, in the virtual scene, an airdrop material may be further dropped periodically. The airdrop material usually may be dropped by a flying virtual item by hanging a carrier or payload virtual item. The carrier virtual item is used for carrying a rare virtual item. The rare virtual item is an airdrop material. The airdrop material is usually a rare material in the virtual scene. The rare material is usually absent from the building, or only a few rare materials are displayed in the virtual scene. Herein, the foregoing scenario is merely used as an example for description, which is not specifically limited in the embodiments of this application. For example, as shown in FIG. 1, the terminal may display a virtual scene in an interface, and display a building, a virtual object, a virtual item, and the like in the virtual scene.

Figure 1A:
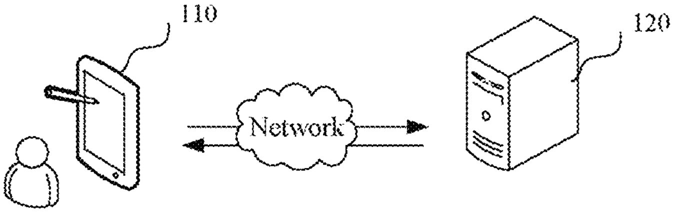
FIG. 1A is a schematic diagram of an application scenario according to an embodiment of this application.

FIG. 1A is a diagram of an application environment of a virtual item movement control method according to an embodiment. Referring to FIG. TA, the virtual item movement control method is applied to a virtual item movement control system. The virtual item movement control system includes a terminal 110 and a server 120. The terminal 110 and the server 120 are connected through a network. The terminal 110 may be specifically a desktop terminal or a mobile terminal. The mobile terminal may be specifically at least one of a mobile phone, a tablet computer, a notebook computer, and the like. The server 120 may be implemented by using an independent server or a server cluster that includes a plurality of servers.

Specifically, the terminal 110 may request the server 120 for a target virtual item, and the server 120 returns the target virtual item to the terminal 110. The terminal 110 displays the target virtual item in a virtual scene, the target virtual item including a flying virtual item and a carrier virtual item, and the flying virtual item being used for hanging the carrier virtual item to descend in the virtual scene; determines a target movement track of the target virtual item according to a first display position and a first speed of the target virtual item and at least one of an environmental condition of the virtual scene and a health value of the target virtual item (in some embodiments, the flying virtual item); and controls the target virtual item to move in the virtual scene according to the target movement track.

Figure 2:
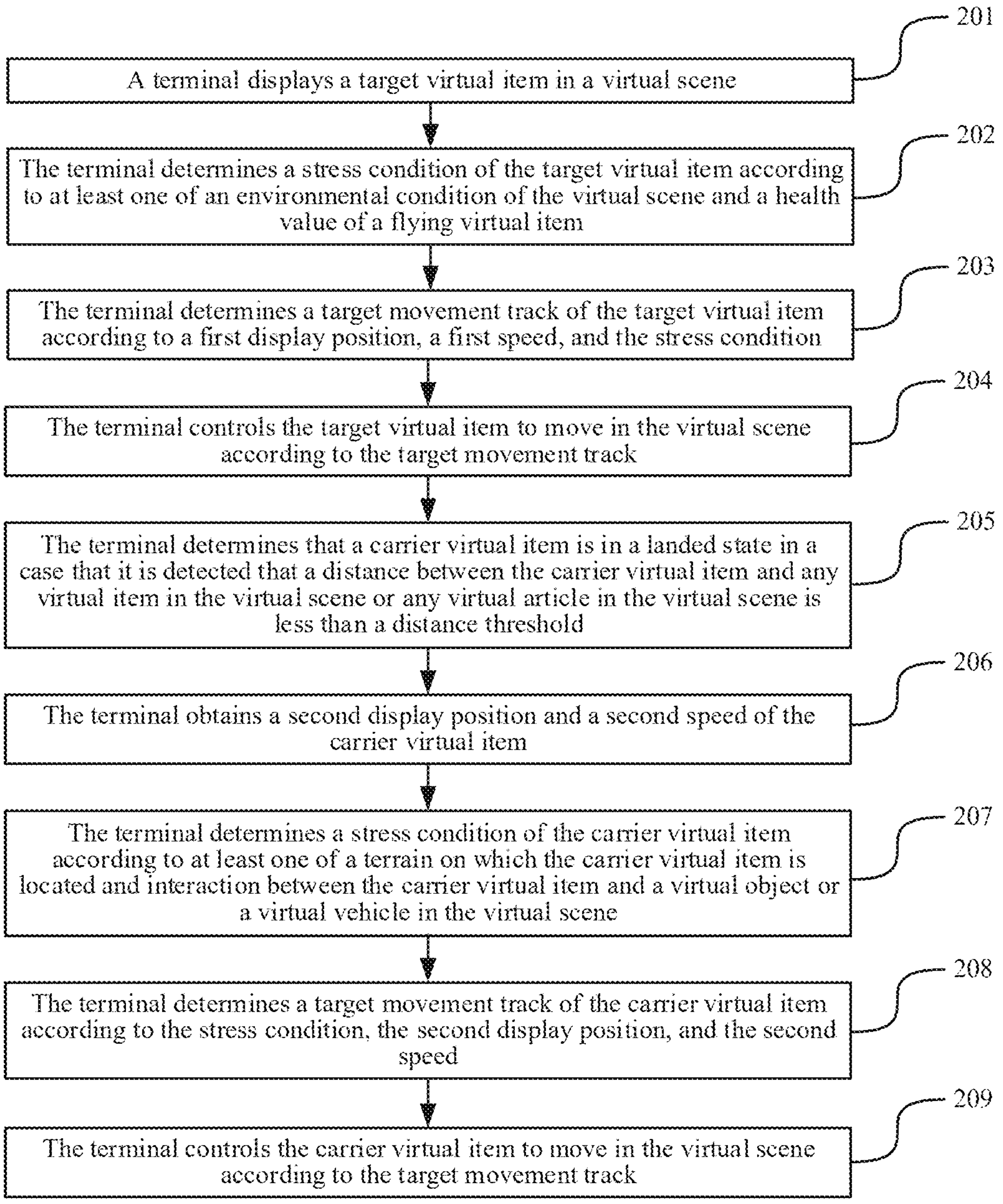
FIG. 2 is a flowchart of a virtual item movement control method according to an embodiment of this application.

FIG. 2 is a flowchart of a virtual item movement control method according to an embodiment of this application. This embodiment of this application is mainly described by using an example in which the method is applied to the terminal 110 in FIG. TA. Referring to FIG. 2, the method includes the following steps:

201. The terminal displays a target virtual item in a virtual scene.

The target virtual item includes a flying virtual item and a carrier virtual item. The flying virtual item is used for hanging the carrier virtual item to descend in the virtual scene. For example, in a video game scenario, the flying virtual item may be a hot air balloon, a plane, or a parachute, the carrier virtual item may be a box or a case, and the flying virtual item may hang the carrier virtual item to descend in the virtual scene.

In an embodiment, the carrier virtual item may be used for carrying a rare virtual item. The rare virtual item is a rare virtual item that can be picked up and controlled by a virtual object. After the carrier virtual item is landed, a user may control a virtual object to approach the carrier virtual item, and performs a pick-up operation on the carrier virtual item, to pick up the rare virtual item carried in the carrier virtual item. The rare virtual item may be a virtual item that is not directly displayed in the virtual scene, for example, an Arctic Warfare Magnum (AWM) sniper rifle, an Armee Universal Gewehr assault rifle, or adrenaline, or may be a virtual item that is displayed in the virtual scene at a probability less than a probability threshold, for example, a level-3 helmet, a level-3 bulletproof vest, or a medical case. A specific form of the virtual item is not limited in this embodiment of this application.

In this embodiment of this application, the terminal may obtain a first display position and a first speed of a to-be-displayed target virtual item, and display the target virtual item at the first display position. The first display position may be an initial display position of the target virtual item, and the first speed may be an initial speed of the target virtual item. The initial speed may include a magnitude and a direction of the speed. The first display position and the first speed determine a predetermined movement track of the target virtual item. Considering that the target virtual item in the virtual scene may be affected by external force, the terminal may adjust the movement track of the target virtual item in real time based on the first display position and the first speed according to an external force factor in the virtual scene. In an embodiment, the first display position of the target virtual item is in a safe zone in the virtual scene. The safe zone is a zone in the virtual scene, and a health value of a virtual object does not decrease in the safe zone.

In an embodiment, the terminal may obtain a first display position and a first speed of a to-be-displayed target virtual item in each item display period, and display the target virtual item at the first display position in the virtual scene. The item display period may be preset by related technical personnel, for example, to 5 minutes, which is not limited in this embodiment of this application. Certainly, in an embodiment, before step 201, a server may further determine whether to display a target virtual item in each item display period, and when determining to display a target virtual item, the server may send an acknowledgement message to the terminal, so that the terminal may perform step 201, to obtain a first display position and a first speed of the target virtual item. Certainly, the server may alternatively determine to display a target virtual item, determine a first display position and a first speed of the target virtual item, and send the first display position and the first speed to the terminal. This is not limited in this embodiment of this application.

Figure 3:
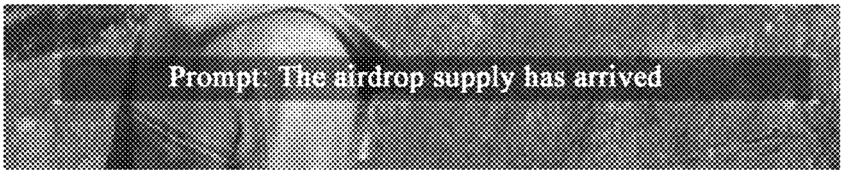
FIG. 3 is a schematic diagram of prompt information according to an embodiment of this application.

In an embodiment, in step 201, the terminal may further display prompt information at the beginning of displaying the target virtual item in the virtual scene, the prompt information being used for prompting the user that the target virtual item appears. The prompt information may be text information, image information, audio information, or special effect information, or certainly may be any combination of the foregoing information, which is not limited in this embodiment of this application. For example, as shown in FIG. 3, the prompt information may be "the airdrop supply has arrived", which is displayed in combination with a sound effect. In this way, the user may be prompted that the airdrop supply appears, and the user may control the virtual object to pick up an airdrop material.

202. The terminal determines a stress condition of the target virtual item according to at least one of an environmental condition of the virtual scene and a health value of the flying virtual item.

The stress condition includes wind power, air resistance, buoyancy, and gravity that the target virtual item encounters. When the target virtual item moves in the virtual scene, both the environmental condition of the virtual scene and a condition of the flying virtual item in the target virtual item may change the stress condition of the target virtual item, so that the target virtual item departs from the original movement track. The terminal may set a health value for the flying virtual item. The health value may be used for indicating a health degree or a fuel quantity of the flying virtual item.

In this embodiment of this application, the terminal may analyze the stress condition of the target virtual item in real time according to the foregoing factors, to control the target virtual item to move according to the stress condition, so that the target virtual item may change its predetermined movement track according to a specific condition in the virtual scene, which can realistically simulate a real scene in which a flying object such as a plane, a hot air balloon, or a parachute hanging an airdrop material may change a predetermined route with an environmental change.

Based on a fact that factors considered when the terminal determines the stress condition of the target virtual item may be different, step 202 may include three cases: (1) The terminal determines the stress condition of the target virtual item according to the environmental condition of the virtual scene. (2). The terminal determines the stress condition of the target virtual item according to the health value of the flying virtual item. (3) The terminal determines the stress condition of the target virtual item according to the environmental condition of the virtual scene and the health value of the flying virtual item.

Since step 202 may include the three cases based on the fact that factors considered when the terminal determines the stress condition of the target virtual item may be different, the terminal may perform at least one of the following step 2021 to step 2024 to determine the stress condition of the target virtual item:

2021. The terminal determines, according to a weight of the target virtual item, the gravity that the target virtual item encounters.

The weight of the target virtual item may be preset in the terminal. The terminal may obtain, according to the weight, the gravity that the target virtual item encounters. Specifically, the terminal may obtain a product of the weight and a gravitational acceleration as the gravity that the target virtual item encounters. Certainly, in an embodiment, the gravity that the target virtual item encounters may alternatively be preset in the terminal, and step 2021 may alternatively be: The terminal obtains the gravity that the target virtual item encounters. A specific implementation is not limited in this embodiment of this application.

For example, if it is preset in the terminal that the weight of the target virtual item is 5000 kilograms (kg) and the gravitational acceleration is 9.8 meters/(second squared) ($m/s^2$), the terminal may obtain a product of 5000 and 9.8, which is 49000 newton (N), the 49000 N being the gravity that the target virtual item encounters. Alternatively, the gravity 49000 N that the target virtual item encounters may be preset in the terminal. The foregoing numerical values are examples for description, and are not limited in this embodiment of this application.

2022. The terminal determines, according to a magnitude and a direction of wind power in the virtual scene, the wind power that the target virtual item encounters.

To simulate a weather condition in a real scene, the virtual scene may include such a weather factor as wind. Both the magnitude and the direction of the wind power in the virtual scene may change dynamically. In an embodiment, a wind power magnitude range may be preset in the terminal, the magnitude of the wind power in the virtual scene may be randomly determined within the range, and when the wind power changes dynamically, a magnitude of the wind power after changing is also within the range. The terminal may obtain the wind power in the virtual scene as the wind power that the target virtual item encounters. In other words, the magnitude and direction of the wind power that the target virtual item encounters are the same as the magnitude and direction of the wind power in the virtual scene.

For example, a wind power magnitude range [20, 200] may be preset in the terminal, the direction of the wind power in the virtual scene may change randomly, and the magnitude of the wind power may also change randomly within 20 N to 200 N. For example, at a moment, the direction of the wind power in the virtual scene is due north, and the magnitude of the wind power is 50 N. Then, the terminal may determine that the direction of the wind power that the target virtual item encounters is due north and the magnitude of the wind power 50 N. The foregoing numerical values are examples for description, and are not limited in this embodiment of this application.

2023. The terminal determines, according to the health value of the flying virtual item, the buoyancy that the target virtual item encounters, the buoyancy being positively correlated to the health value.

It may be understood that, the buoyancy that the target virtual item encounters varies with the health value of the flying virtual item. A higher health value indicates stronger buoyancy, and a lower health value indicates weaker buoyancy. For example, as described in the foregoing case, if the flying virtual item is destructed or the fuel quantity decreases, the health value of the flying virtual item may decrease; then, the buoyancy that the target virtual item encounters decreases, and the target virtual item descends at a higher speed.

Specifically, a correspondence between a health value and buoyancy may be preset in the terminal, and the terminal may obtain corresponding buoyancy from the correspondence according to the health value. Certainly, the terminal may alternatively calculate the buoyancy according to a volume of the flying virtual item, an air density, a gravitational acceleration, and the like, which is not specifically limited in this embodiment of this application. Further, a correspondence between a health value and a volume may be preset in the terminal, the health value being positively correlated to the volume. Then, the terminal may determine the volume of the flying virtual item according to the health value of the flying virtual item and a correspondence between the health value and the volume, to calculate the buoyancy according to the volume, which is not limited in this embodiment of this application.

For example, the correspondence between a health value and buoyancy is a linear relationship. For example, the buoyancy is a first product of the health value and a first preset coefficient. The first preset coefficient may be any positive number. For example, the first preset coefficient is 100. If the health value is 100, the buoyancy is 10000 N. If the health value is 20, the buoyancy is 2000 N. In another possible implementation, for example, the correspondence between a health value and a volume is a linear relationship. The volume is a second product of the health value and a second preset coefficient. The second preset coefficient may be any positive number. For example, the second preset coefficient is 10. If the health value is 100, the volume is 1000 cubic meters. If the health value is 20, the volume is 200 cubic meters. The terminal may obtain a third product of the air density, the volume of the flying virtual item, and the gravitational acceleration, the third product being the buoyancy that the target virtual item encounters. For example, the air density is 1.29 kilograms/(meter cubed) ($kg/m^3$), the gravitational acceleration is 9.8 $m/s^2$, and the volume is 1000 cubic meters. Then, the buoyancy that the target virtual item encounters is 12642 N. The foregoing numerical values are examples for description, and are not limited in this embodiment of this application.

2024. The terminal determines, according to the health value of the flying virtual item and a movement speed of the target virtual item, the air resistance that the target virtual item encounters.

After determining the health value of the flying virtual item in step 2023, the terminal may further determine, according to the health value and the movement speed of the target virtual item, the air resistance that the target virtual item encounters. A transformation relationship between a health value, a movement speed, and air resistance may be preset in the terminal, so that the terminal may determine corresponding air resistance according to the health value and the movement speed. Certainly, the terminal may alternatively determine a windward area of the flying virtual item according to the health value, and calculate, based on the windward area, an air resistance coefficient, an air density, and the movement speed of the target virtual item, the air resistance that the target virtual item encounters, which is not limited in this embodiment of this application.

For example, the transformation relationship between a health value, a movement speed, and air resistance may be a preset function. The terminal may calculate air resistance based on a current health value of the flying virtual item and a current movement speed of the target virtual item according to the preset function. Certainly, for example, the health value of the flying virtual item is 100, the movement speed of the target virtual item is 20 meters per second (m/s), the air resistance coefficient is 0.2, and the air density is 1.29 $kg/m^3$, the terminal may alternatively determine a volume of the flying virtual item according to the health value of the flying virtual item, to obtain a windward area of the flying virtual item. For example, the windward area is 400 square meters ($m^2$). Then, the terminal may obtain a product of 0.5, the air resistance coefficient, the air density, the windward area, and a square of the movement speed as the air resistance that the target virtual item encounters, which is 20640 N. The foregoing numerical values are examples for description, and are not limited in this embodiment of this application.

In the three cases included in step 202, the terminal may perform at least one of step 2021 to step 2024, and the terminal may perform different steps in different cases. For example, in case (1), the terminal may perform steps 2021 and 2022; and in case (2), the terminal may perform steps 2021, 2023, and 2024. Certainly, the foregoing descriptions are only examples, and specific steps performed by the terminal in different cases are not limited in this embodiment of this application.

In an embodiment, for the health value of the flying virtual item, an initial health value, for example, 100, of the flying virtual item may be preset in the terminal. Subsequently, the health value of the flying virtual item may decrease due to other factors. Specifically, the terminal may decrease the health value of the flying virtual item according to a weather condition in the virtual scene, destruction behavior of a virtual object in the virtual scene to the flying virtual item, or a movement duration of the flying virtual item.

In this embodiment of this application, the flying virtual item hangs the carrier virtual item to descend, and a condition of the flying virtual item affects movement of the flying virtual item and the carrier virtual item. Specifically, the health value of the flying virtual item may affect buoyancy that may be provided for the carrier virtual item when the flying virtual item hangs the carrier virtual item and moves. For example, the flying virtual item is a hot air balloon, a health value of the hot air balloon may be a fuel quantity of the hot air balloon or a health degree of the hot air balloon, and when the hot air balloon is damaged, the health value of the hot air balloon decreases.

To realistically simulate a weather condition in a real scene, the virtual scene may further include a weather condition such as sunny, raining, or thunder and lightning. The weather condition in the virtual scene may affect the movement track of the flying virtual item. Specifically, the weather condition may destruct the flying virtual item. For example, rain may extinguish fire of the hot air balloon, and lightning may destruct the hot air balloon.

In addition to the weather condition, the flying virtual item may also be destructed by the virtual object controlled by the user, or the health value of the flying virtual item may decrease with increasing of the movement duration. Then, when the terminal determines, based on the health value of the flying virtual item, the buoyancy that the target virtual item encounters, the buoyancy decreases. In all such conditions, the target virtual item may descend at a higher speed. A manner of decreasing the health value of the flying virtual item by the terminal varies with different destruction behavior of the virtual object to the flying virtual item or different movement durations of the flying virtual item. Specifically, the decreasing the health value of the flying virtual item by the terminal may include the following three cases:

Case 1: The terminal decreases the health value of the flying virtual item with increasing of the movement duration in a case that the weather condition is sunny.

In case 1, the weather condition is sunny, an environment in the virtual scene basically does not destruct the flying virtual item, and a factor affecting the health value of the flying virtual item may be the movement duration of the flying virtual item and destruction behavior of a virtual object to the flying virtual item. In case 1, if no destruction behavior of a virtual object to the flying virtual item is detected, the health value of the flying virtual item may decrease with increasing of the movement duration of the flying virtual item. In other words, a longer movement duration indicates a lower health value.

In an embodiment, a relationship between the health value and the movement duration may alternatively be as follows: When the movement duration is less than a duration threshold, the health value of the flying virtual item remains unchanged. When the movement duration is greater than the duration threshold, the health value of the flying virtual item decreases with increasing of the movement duration of the flying virtual item. The duration threshold may be preset by related technical personnel, which is not limited in this embodiment of this application. For example, the duration threshold may be set so that the flying virtual item may horizontally move in the virtual scene for a period of time and then start to descend at a specific position, to increase a total descending duration of the target virtual item, making it easy for the user to discover a position of the target virtual item, and expanding a landing point range of the target virtual item, which can enhance the intensity of game competition in the video game scenario, thereby improving user experience.

Case 2: The terminal decreases, in a case that the weather condition is raining or is thunder and lightning and it is determined that the flying virtual item changes based on the weather condition, the health value of the flying virtual item over time by using a time point at which the flying virtual item changes as a start point.

In case 2, since the weather condition is bad, the flying virtual item may change due to the weather condition. For example, the weather condition may destruct the flying virtual item. Then, starting from a moment at which the flying virtual item is destructed, the health value of the flying virtual item decreases over time. A change rule of the health value decreasing over time may be preset by related technical personnel. For example, the health value may be [0, 100], and the change rule may be that the health value decreases by 5 per second. This is not limited in this embodiment of this application.

In an embodiment, an item change probability may be preset in the terminal. The item change probability is a probability that the flying virtual item changes based on the weather condition. Then, in case 2, the terminal may determine, according to the preset item change probability at a preset time interval, whether the flying virtual item changes based on the weather condition in a case that the weather condition is raining or is thunder and lightning. Both the preset time interval and the item change probability may be preset by related technical personnel, whose values are not limited in this embodiment of this application.

Certainly, there is also a possible scenario in which the weather condition is raining or is thunder and lightning and it is determined that the flying virtual item does not change based on the weather condition. In this scenario, the terminal may decrease the health value of the flying virtual item with increasing of the movement duration of the flying virtual item. Details are not repeated in this embodiment of this application.

In an embodiment, the item change probability and the preset time interval may vary with different weather conditions. For example, a preset time interval in the weather condition of raining may be less than a preset time interval in the weather condition of thunder and lightning, or the preset time interval in the weather condition of raining may be greater than the preset time interval in the weather condition of thunder and lightning. An item change probability in the weather condition of raining is greater than an item change probability in the weather condition of thunder and lightning, or the item change probability in the weather condition of raining is less than the item change probability in the weather condition of thunder and lightning. This is not limited in this embodiment of this application.

In an embodiment, in case 2, when the flying virtual item changes based on the weather condition, the terminal may further display an animation of the flying virtual item, to reflect the change of the flying virtual item. The change of the flying virtual item also varies with different weather conditions, and so does the displayed animation of the flying virtual item. Specifically, animation display of the flying virtual item may include the following two modes:

In a first animation display mode, the terminal displays a first animation of the flying virtual item in the virtual scene in a case that the weather condition is raining and it is determined that the flying virtual item changes based on the weather condition, the first animation being used for reflecting a state in which fuel combustion of the flying virtual item is extinguished based on the weather condition.

In the first animation display mode, the weather condition is raining, and the fuel combustion of the flying virtual item may be extinguished by rain, causing the health value of the flying virtual item to decrease. To realistically simulate the extinguishment of the fuel combustion of the flying virtual item, the terminal may further display the first animation of the flying virtual item, to reflect a state in which the fuel combustion of the flying virtual item is extinguished. For example, the terminal may play a special effect that a flame is extinguished, and cancel displaying of the flame in the flying virtual item.

In a second animation display mode, the terminal continuously displays a second animation of the flying virtual item in the virtual scene in a case that the weather condition is thunder and lightning and it is determined that the flying virtual item changes based on the weather condition, the second animation being used for reflecting a state in which the flying virtual item is continuously burned based on the weather condition.

In the second animation display mode, the weather condition is thunder and lightning, and the flying virtual item may start to be burned as struck by lightning, causing the health value of the flying virtual item to decrease. To realistically simulate a situation in which the flying virtual item is struck by lightning and burned, the terminal may further continuously display the second animation of the flying virtual item, to reflect a state in which the flying virtual item is continuously burned based on the weather condition. For example, the terminal may play a special effect of a lightning stroke, and play a special effect that the flying virtual item is continuously burned after the special effect of the lightning stroke.

When the health value of the flying virtual item changes, the terminal may further display a third animation of the flying virtual item, to reflect the change of the flying virtual item. Specifically, the terminal may display the third animation of the flying virtual item in the virtual scene, the third animation being used for reflecting that a size of the flying virtual item changes with the health value of the flying virtual item, and the size being positively correlated to the health value. That is, a higher health value indicates a larger size, and a lower health value indicates a smaller size. For example, the flying virtual item is a hot air balloon. When a fuel quantity of the hot air balloon decreases or the hot air balloon is destructed, the hot air balloon is gradually shrunken. To realistically simulate this change, a third animation may be displayed. To be specific, the hot air balloon is displayed with a size becoming smaller as the health value decreases. In other words, the hot air balloon is shrunken as the health value decreases.

Case 3: The terminal decreases, in a case that destruction behavior of a virtual object in the virtual scene to the flying virtual item is detected, the health value of the flying virtual item over time by using a time point at which the flying virtual item changes as a start point.

In case 3, the user may control the virtual object to destruct the flying virtual item, for example, may control a gun item or another attack item to attack the flying virtual item. If the flying virtual item is hit, the terminal may detect destruction behavior of the virtual object to the flying virtual item. Then, starting from a moment at which the flying virtual item is destructed, the health value of the flying virtual item may decrease over time.

A change rule of the health value decreasing over time may be preset by related technical personnel. For example, the health value may decrease linearly over time. The change rule may alternatively be determined according to a quantity of destructions of the destruction behavior or a type of the virtual item, which is not limited in this embodiment of this application. The change rule may be the same as or different from the change rule in case 2, which is not limited in this embodiment of this application.

In an embodiment, different from case 1 in which the duration threshold is set so that the flying virtual item may horizontally move in the virtual scene for a period of time, in case 2 and case 3, because the flying virtual item is destructed due to the weather condition or an artificial factor, causing the health value of the flying virtual item to decrease, due to the decrease of the health value, the target virtual item starts to descend before a horizontal movement duration reaches the duration threshold.

203. The terminal determines a target movement track of the target virtual item according to the first display position, the first speed, and the stress condition.

After determining the stress condition of the target virtual item in step 202, the terminal may determine an acceleration of the target virtual item according to the stress condition, to determine how to change a speed magnitude or direction based on the first speed. That is, it may be determined how the target virtual item starts to move from the first display position. For example, the terminal may obtain a display position of the target virtual item in each frame based on the acceleration, the first speed, and the first display position, that is, obtain the target movement track of the target virtual item. The target movement track is a track along which the target virtual item is to move. The terminal may determine the stress condition of the target virtual item in real time according to the weather condition, the destruction behavior of the virtual object to the flying virtual item, or the like, and adjust the movement track of the target virtual item in real time.

The foregoing step 202 and step 203 are a process of determining a target movement track of the target virtual item according to a first display position and a first speed of the target virtual item and at least one of an environmental condition of the virtual scene and a health value of the flying virtual item. The process may include three cases: determining the target movement track of the target virtual item according to the first display position and the first speed of the target virtual item and the environmental condition of the virtual scene; or determining the target movement track of the target virtual item according to the first display position and the first speed of the target virtual item and the health value of the flying virtual item; or determining the target movement track of the target virtual item according to the first display position and the first speed of the target virtual item, the environmental condition of the virtual scene, and the health value of the flying virtual item. In other words, the three cases correspond to cases (1) to (3) in step 202. Details are not repeated in this embodiment of this application.

The target virtual item may have the target movement track changing with the environmental condition in the virtual scene or the health value of the flying virtual item, instead of directly descending vertically, which can more realistically simulate a real scene in which a flying object changes an original route with an environmental factor or a fuel condition of the flying object, and improve the display efficiency and the display effect of the virtual item.

204. The terminal controls the target virtual item to move in the virtual scene according to the target movement track.

Figure 4:
FIG. 4 is a schematic diagram of a target virtual item according to an embodiment of this application.

After determining the target movement track of the target virtual item, the terminal may control the target virtual item to move in the virtual scene according to the target movement track. For example, as shown in FIG. 4, the target virtual item is in the form of a hot air balloon hanging an airdrop box. The terminal controls the hot air balloon hanging the airdrop box to descend in the virtual scene. After seeing the target virtual item, the user may control the virtual object to move in a direction toward the target virtual item, to obtain a rare virtual item carried in the carrier virtual item in the target virtual item, to obtain a better resource and gain an advantage in fighting against another virtual object.

205. The terminal determines that the carrier virtual item is in a landed state in a case that it is detected that a distance between the carrier virtual item and any virtual item in the virtual scene or any virtual article in the virtual scene is less than a distance threshold.

When the flying virtual item hanging the carrier virtual item is descending, if the carrier virtual item gets to a ground surface, a water surface, a building, a car, a boat, a box, or other virtual articles or virtual items, the descending may stop. In other words, the flying virtual item hanging the carrier virtual item is landed. Specifically, the terminal may detect a distance between the carrier virtual item and a virtual item or a virtual article in the virtual scene by using a ray detection method. Specifically, the terminal may emit a ray vertically downward from the carrier virtual item to detect a distance between the carrier virtual item and an object below. When the distance is greater than or equal to the distance threshold, the terminal may determine that the carrier virtual item is still in a descending state. When the distance is less than the distance threshold, the terminal may determine that the carrier virtual item is in the landed state. Certainly, the terminal may alternatively calculate the distance based on coordinates through ray detection, or calculate the distance through ray detection and projection, which is not limited in this embodiment of this application.

In an embodiment, in step 205, when determining that the carrier virtual item is in the landed state, the terminal may further determine whether the current carrier virtual item can stop on the any virtual item or the any virtual article. If yes, the terminal determines that the carrier virtual item is in the landed state. If no, the terminal determines that the carrier virtual item is not in the landed state. In this way, a state in which the carrier virtual item collides with a building during descending and then continues to descend is not mistakenly determined as the landed state.

In an embodiment, to realistically simulate movement of a flying object when the flying object is landed, when determining that the carrier virtual item is in the landed state, the terminal may further display, according to a type of the any virtual item or the any virtual article, a fourth animation corresponding to the type, the fourth animation being used for reflecting movement of the carrier virtual item after the carrier virtual item is landed.

The terminal may pre-store a plurality of fourth animations. Each fourth animation may correspond to a type of virtual items or virtual articles. Then, according to different types of virtual items or virtual articles that the carrier virtual item gets to when landed, the terminal may obtain and display different fourth animations. For example, if the carrier virtual item collides with a ground surface, a building, or a vehicle such as a car or a boat, the terminal may display an animation that the carrier virtual item bounces and then descends. If the carrier virtual item is landed on a water surface, the terminal may display an animation that water splashes above the water surface and the carrier virtual item is soaked in water, then floats upward, and finally floats on the water surface.

In an embodiment, to reduce a display area of the target virtual item after the target virtual item is landed, and optimize a display effect of the target virtual item, the terminal may further display a fifth animation corresponding to the health value according to the health value of the flying virtual item, the fifth animation being used for reflecting a process of the flying virtual item disappearing in the virtual scene.

The terminal may pre-store the fifth animation. In the foregoing step, the flying virtual item may be destructed, causing the flying virtual item to have different health values. Therefore, the flying virtual item may disappear in different manners. In this case, the terminal may include a plurality of fifth animations, and different fifth animations may correspond to different health values. The terminal may obtain a corresponding fifth animation according to the health value of the flying virtual item, and display the fifth animation. For example, the fifth animation may include as follows:

1. When the flying virtual item does not change based on the weather condition, and no destruction behavior of a virtual object to the flying virtual item is detected, the fifth animation may be that the flying virtual item is detached from the carrier virtual item and then moves upward, and the displaying of the flying virtual item is canceled after an item retention time. The item retention time is a time within which the flying virtual item can be displayed after the carrier virtual item is landed. The item retention time may be preset by related technical personnel, for example, to 5 seconds, which is not limited in this embodiment of this application.

2. Corresponding to case 3 in step 202, when the health value of the flying virtual item decreases based on destruction behavior of a virtual object to the flying virtual item, the fifth animation may be that the flying virtual item is paralyzed, and the displaying of the flying virtual item is canceled after an item retention time.

3. Corresponding to case 2 in step 202 in which the weather condition is thunder and lightning, when the weather condition is thunder and lightning and it is determined that the flying virtual item changes based on the weather condition, the fifth animation may be determined according to the health value of the flying virtual item. When the health value of the flying virtual item is greater than a health value threshold, the fifth animation may be that the flying virtual item is detached from the carrier virtual item and then moves upward, and the displaying of the flying virtual item is canceled after an item retention time. When the health value of the flying virtual item is less than or equal to the health value threshold, the fifth animation may be that the flying virtual item is paralyzed, and the displaying of the flying virtual item is canceled after an item retention time. When displaying the fifth animation, the terminal may still continuously display the second animation of the flying virtual item.

4. Corresponding to case 2 in step 202 in which the weather condition is raining, when the weather condition is raining and it is determined that the flying virtual item changes based on the weather condition, the fifth animation may be that a state when the flying virtual item is landed is retained, and the displaying of the flying virtual item is canceled after an item retention time.

Figure 5:
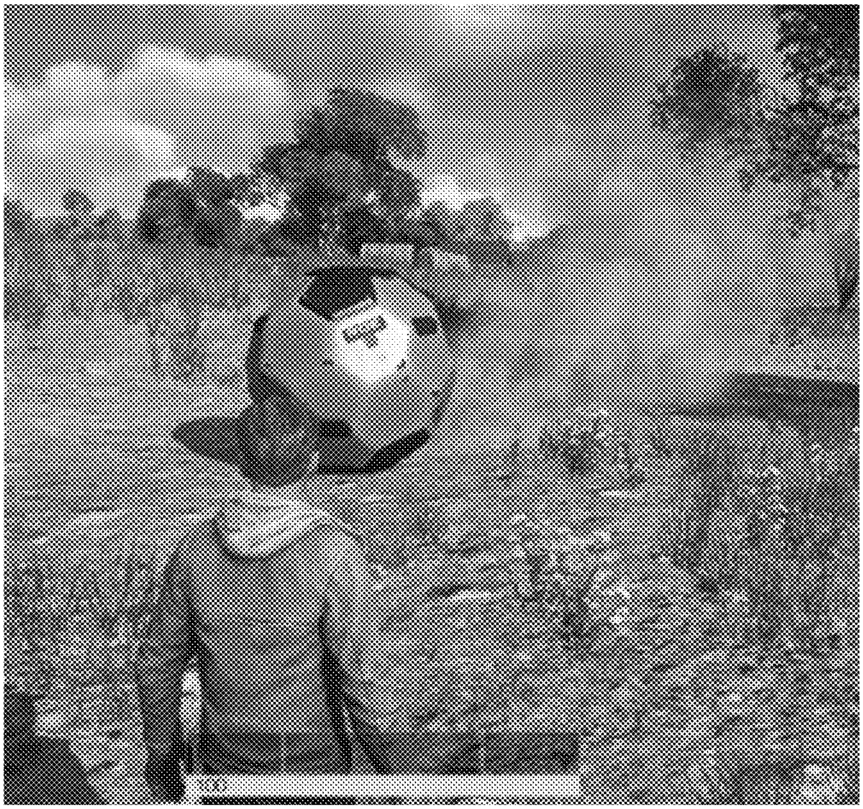
FIG. 5 is a schematic diagram of position prompt information according to an embodiment of this application.

In an embodiment, to make it easy for the user to discover the carrier virtual item, and to improve the display efficiency of the carrier virtual item, the terminal may further display position prompt information at a prompt position of the carrier virtual item, in addition to displaying the animations of the flying virtual item and the carrier virtual item during landing. The prompt position may be above the carrier virtual item or a position on the carrier virtual item, which is not limited in this embodiment of this application. The position prompt information may be text information, icon information, or special effect information. For example, as shown in FIG. 5, the position prompt information may be smog. Certainly, the position prompt information may alternatively be a special effect of light emission, which is not limited in this embodiment of this application.

Further, when determining that the carrier virtual item is landed, the terminal may further obtain a to-be-picked-up rare virtual item, so that when performing a pick-up operation on the carrier virtual item, the user may obtain information about the rare virtual item in the carrier virtual item, to further perform a pick-up operation on the rare virtual item. Specifically, the terminal may obtain the information about the to-be-picked-up rare virtual item from the server. Alternatively, the information may be calculated by the terminal, and the server checks a calculation result of the terminal. This is not limited in this embodiment of this application.

For example, the terminal obtains the information about the to-be-picked-up rare virtual item from the server. The following information may be preset in the server: a quantity of to-be-displayed rare virtual items and their types, candidate rare virtual items included in each type of rare virtual items, and a display probability and a stock quantity of each candidate rare virtual item. The display probability of the candidate rare virtual item is a probability that the candidate rare virtual item is selected as a to-be-displayed rare virtual item. The server may obtain a candidate rare virtual item from a plurality of candidate rare virtual items of each type based on the foregoing information, and determine whether a quantity of display times of the candidate rare virtual item reaches a stock quantity. If yes, the server re-obtains a candidate rare virtual item of the same type. If no, the server uses the candidate rare virtual item as the to-be-picked-up rare virtual item, to ensure the fairness and resource balance of competition. The foregoing description is only an example, and a specific process of how the server obtains the to-be-picked-up rare virtual item is not limited in this embodiment of this application.

206. The terminal obtains a second display position and a second speed of the carrier virtual item.

The second display position and the second speed are a display position and a speed of the carrier virtual item when the carrier virtual item is landed. The speed includes a magnitude and a direction of the speed. The foregoing step 201 to step 205 are method steps of how the terminal controls the target virtual item to move when the flying virtual item hangs the carrier virtual item to descend until the carrier virtual item is landed, the target virtual item including the flying virtual item and the carrier virtual item. In this embodiment of this application, after the carrier virtual item is landed, the terminal may further determine, according to a terrain on which the carrier virtual item is located and interaction between the carrier virtual item and a virtual object or another virtual item, a target movement track of the carrier virtual item after the carrier virtual item is landed, which, as compared with the related art in which a carrier virtual item has a fixed position and cannot move after landed, improves the display efficiency and the display effect of the carrier virtual item, and can more realistically simulate a real scene in which an object moves depending on an external condition.

The terminal may obtain a second display position and a second speed of the carrier virtual item, the second speed including a magnitude and a direction of the speed. Similar to the process of determining the target movement track of the target virtual item, the terminal may also determine the target movement track of the carrier virtual item based on the second display position, the second speed, and a stress condition, to implement a process of controlling the carrier virtual item to move after landed.

207. The terminal determines a stress condition of the carrier virtual item according to at least one of a terrain on which the carrier virtual item is located and interaction between the carrier virtual item and a virtual object or a virtual vehicle in the virtual scene.

The stress condition includes at least one of gravity, support force, buoyancy, friction, or thrust that the carrier virtual item encounters. Similar to step 202, step 207 may also include three cases: the terminal determines the stress condition of the carrier virtual item according to the terrain on which the carrier virtual item is located; or the terminal determines the stress condition of the carrier virtual item according to interaction between the carrier virtual item and a virtual object or a virtual vehicle in the virtual scene; or the terminal determines the stress condition of the carrier virtual item according to the terrain on which the carrier virtual item is located and interaction between the carrier virtual item and a virtual object or a virtual vehicle in the virtual scene.

The stress condition of the carrier virtual item may vary with different terrains on which the carrier virtual item is located or different interaction between the carrier virtual item and a virtual object or a virtual vehicle in the virtual scene. For example, on land, the carrier virtual item may encounter the support force, while on a water surface, the carrier virtual item may encounter the buoyancy, and when a virtual object or a virtual vehicle exerts thrust to the carrier virtual item, the carrier virtual item may further encounter the thrust. Specifically, in step 207, a process of determining the stress condition of the carrier virtual item by the terminal may include the following cases:

Case 1: In a case that the carrier virtual item is on land and a ground surface on which the carrier virtual item is located is maintained horizontal, the terminal determines, according to a weight of the carrier virtual item, the gravity, the support force, and the friction that the carrier virtual item encounters.

Case 2: In a case that the carrier virtual item is on land and a ground surface on which the carrier virtual item is located is inclined, the terminal determines, according to a weight of the carrier virtual item and an inclination angle of the ground surface, the gravity, the support force, and the friction that the carrier virtual item encounters.

For example, the carrier virtual item is on land, and the ground surface has a relatively large inclination angle, and the gravity, the support force, and the friction that the carrier virtual item encounters are determined. Then, a direction of resultant force that the carrier virtual item encounters may be a direction of inclining downward along the ground surface, and an inclination angle is relatively small. Alternatively, the direction of the resultant force may be a direction of inclining upward. This is not limited in this embodiment of this application.

Case 3: In a case that the carrier virtual item is on a water surface, the terminal determines, according to a weight of the carrier virtual item or according to a weight of the carrier virtual item and a volume of a part of the carrier virtual item in water, the gravity and the buoyancy that the carrier virtual item encounters.

For example, the carrier virtual item is on a water surface, and the gravity and the buoyancy that the carrier virtual item encounters may be the same, or the buoyancy may be greater than the gravity so that the carrier virtual item further floats upward until the gravity is equal to the buoyancy and the carrier virtual item floats on the water surface.

Case 4: In a case that the carrier virtual item is on land and it is detected that the virtual object in the virtual scene exerts or the virtual object controls the virtual vehicle to exert thrust to the carrier virtual item, the terminal determines, according to a weight of the carrier virtual item and an inclination degree of a ground surface, the gravity, the support force, the thrust, and the friction that the carrier virtual item encounters.

For example, the virtual vehicle may be a car, and the user may control the virtual object to drive the vehicle, and may control the virtual object to drive the vehicle to exert thrust to the carrier virtual item. If the ground surface is maintained horizontal, a direction of resultant force may be a direction of the thrust exerted by the vehicle to the carrier virtual item, or a reverse direction of the thrust, or the resultant force may be zero. If the ground surface is inclined, the direction of the resultant force may be a downward direction along the ground surface or an integrated direction of the direction of the thrust and the downward direction along the ground surface. This is not limited in this embodiment of this application.

Case 5: In a case that the carrier virtual item is on a water surface and it is detected that the virtual object in the virtual scene exerts or the virtual object controls the virtual vehicle to exert thrust to the carrier virtual item, the terminal determines, according to a weight of the carrier virtual item or according to a weight of the carrier virtual item and a volume of a part of the carrier virtual item in water, the gravity, the buoyancy, the thrust, and the friction that the carrier virtual item encounters.

For example, the virtual vehicle may be a boat, and the user may control the virtual object to drive the vehicle, and may control the virtual object to drive the vehicle to exert thrust to the carrier virtual item. A direction of resultant force may be a direction of the thrust exerted by the vehicle to the carrier virtual item, or a reverse direction of the thrust, or the resultant force may be zero. This is not limited in this embodiment of this application.

In the foregoing cases, the terminal may determine the stress condition of the carrier virtual item in different implementations. For example, in case 2, a correspondence between an inclination angle and resultant force may be preset in the terminal, so that the terminal may obtain corresponding resultant force according to the inclination angle. Alternatively, the terminal may calculate the resultant force according to the inclination angle, a friction coefficient, the weight of the carrier virtual item, and the like. Certainly, other implementations may alternatively be used, which are not listed one by one in this embodiment of this application. A specific implementation adopted above is not limited either.

208. The terminal determines a target movement track of the carrier virtual item according to the stress condition, the second display position, and the second speed.

Similar to step 203, the terminal may determine an acceleration of the carrier virtual item according to the stress condition of the carrier virtual item, to determine the target movement track of the carrier virtual item based on the acceleration, the second display position, and the second speed. Details are not repeated in this embodiment of this application. The target movement track of the carrier virtual item is a track along which the carrier virtual item is to move after landed.

Steps 207 and 208 are a process of determining a target movement track of the carrier virtual item according to the second display position, the second speed, and at least one of a terrain on which the carrier virtual item is located and interaction between the carrier virtual item and a virtual object or a virtual vehicle in a virtual scene. The process may include the following three cases: determining the target movement track of the carrier virtual item according to the terrain on which the carrier virtual item is located, the second display position, and the second speed; or determining the target movement track of the carrier virtual item according to interaction between the carrier virtual item and a virtual object or a virtual vehicle in the virtual scene, the second display position, and the second speed; or determining the target movement track of the carrier virtual item according to the terrain on which the carrier virtual item is located, interaction between the carrier virtual item and a virtual object or a virtual vehicle in the virtual scene, the second display position, and the second speed. The three cases correspond to the three cases included in step 207. Details are not repeated in this embodiment of this application.

Both the terrain on which the carrier virtual item is located and interaction between a virtual object or a virtual vehicle and the carrier virtual item may affect movement of the carrier virtual item, so that the carrier virtual item moves more flexibly, which looks more like movement in an actual environment, and can more realistically simulate a real scene in which an object changes a movement track with an environmental change, and improve the display efficiency and the display effect of the virtual item.

209. The terminal controls the carrier virtual item to move in the virtual scene according to the target movement track.

After determining the target movement track of the carrier virtual item, the terminal may control the carrier virtual item to move in the virtual scene according to the target movement track. For example, the carrier virtual item may move downward on a hill with a relatively large inclination angle, and the virtual object may drive a car to push the carrier virtual item to move.

Figure 6:
FIG. 6 is a schematic diagram of a carrier virtual item according to an embodiment of this application.
Figure 7:
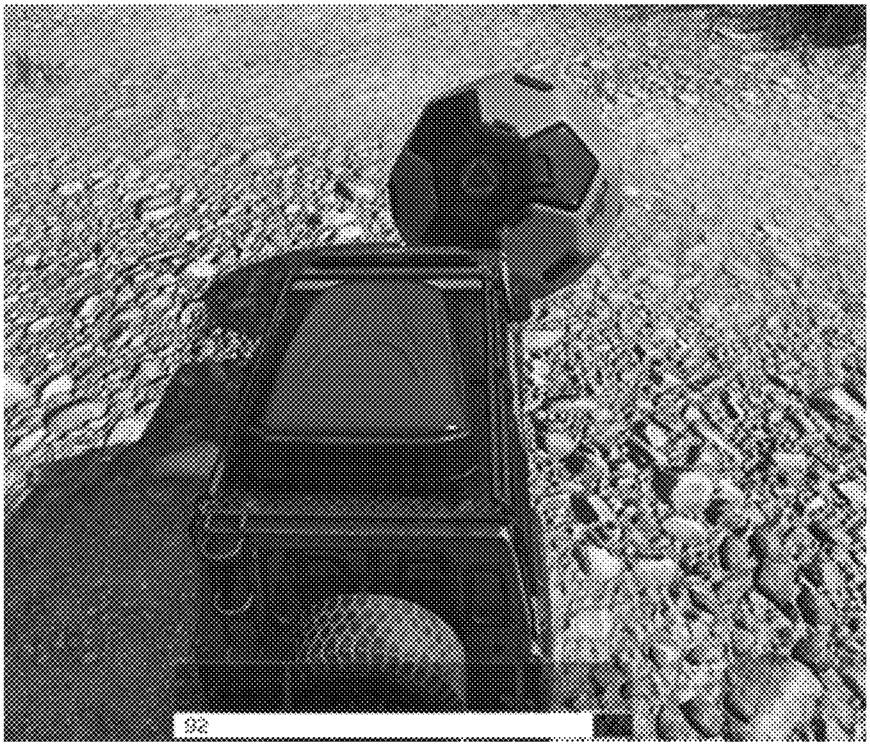
FIG. 7 is a schematic diagram of movement of a carrier virtual item according to an embodiment of this application.

In an embodiment, a shape of the carrier virtual item may be a 32-hedron, and the process of determining a target movement track of the carrier virtual item in step 208 may alternatively be: The terminal may determine a target angular velocity of the carrier virtual item according to the stress condition, the second display position, and the second speed. Then, in step 209, the terminal may control the carrier virtual item to roll in the virtual scene according to the target angular velocity. For example, as shown in FIG. 6, the shape of the carrier virtual item may be a 32-hedron, and as shown in FIG. 7, the user may control the virtual object to drive a car to push the carrier virtual item to move, the carrier virtual item moving in a manner of rolling.

In an embodiment, it may be further set in the terminal that the carrier virtual item cannot be destructed by a virtual object. Certainly, because the carrier virtual item may move, when the carrier virtual item collides with a virtual object, the carrier virtual item may cause damage to a health value of the virtual object. Specifically, in a case that it is detected that a distance between the carrier virtual item and a virtual object in the virtual scene is less than a distance threshold or a distance between the carrier virtual item and a virtual vehicle controlled by a virtual object in the virtual scene is less than a distance threshold, and a relative speed between the carrier virtual item and the virtual object is greater than a speed threshold, the terminal may determine a health damage value of the virtual object according to the relative speed. The terminal subtracts the health damage value from a health value of the virtual object, to obtain an adjusted health value of the virtual object.

The health damage value may be positively correlated to the relative speed. In other words, a higher relative speed indicates a higher health damage value. It may be understood that, a higher relative speed between the virtual object and the carrier virtual item indicates greater damage to the virtual object when the carrier virtual item collides with the virtual object, that is, the health damage value is higher.

In an embodiment, in the foregoing two cases, at a fixed relative speed, the health damage value of the virtual object may vary with different states of the virtual object. The states of the virtual object refer to whether the virtual object currently controls the virtual vehicle.

Specifically, when it is detected that the distance between the carrier virtual item and the virtual object in the virtual scene is less than the distance threshold, and the relative speed between the carrier virtual item and the virtual object is greater than the speed threshold, the terminal may determine a first health damage value of the virtual object according to the relative speed.

When it is detected that the distance between the carrier virtual item and the virtual vehicle controlled by the virtual object in the virtual scene is less than the distance threshold, and the relative speed between the carrier virtual item and the virtual object is greater than the speed threshold, the terminal may determine a second health damage value of the virtual object according to the relative speed, the second health damage value being different from the first health damage value.

In an embodiment, the second health damage value may be less than the first health damage value. In this way, at a fixed relative speed between the flying virtual item and the virtual object, when the carrier virtual item causes health damage to the virtual object, the virtual vehicle controlled by the virtual object may protect the virtual object to some extent, so that the health damage value of the virtual object is smaller. Certainly, if at different relative speeds, when the virtual object controls the virtual vehicle, the movement speed of the virtual object may be higher, and a relative speed between the virtual object and the carrier virtual item may also be higher. In this case, the health damage value of the virtual object may also be higher.

Certainly, when the virtual object controls the virtual vehicle, the terminal may also determine a health damage value of the virtual vehicle according to the relative speed, and subtract the health damage value from a health value of the virtual vehicle, to obtain an adjusted health value of the virtual vehicle. Similarly, the health damage value of the virtual vehicle may also be positively correlated to the relative speed. Details are not repeated in this embodiment of this application.

Certainly, in this embodiment of this application, the user may perform a pick-up operation on the carrier virtual item, and when detecting the pick-up operation, the terminal may display information about a to-be-picked-up rare virtual item carried in the carrier virtual item. When detecting a pick-up operation on any rare virtual item, the terminal may display the rare virtual item on the virtual object.

In an embodiment, an additional item refresh probability may be further set in the terminal. In step 201, the terminal may further determine to display a plurality of target virtual items, for example, display two target virtual items. In this case, the terminal may perform the foregoing steps to determine target movement tracks of the plurality of target virtual items and target movement tracks of carrier virtual items in the plurality of target virtual items. Details are not repeated in this embodiment of this application.

Figure 8:
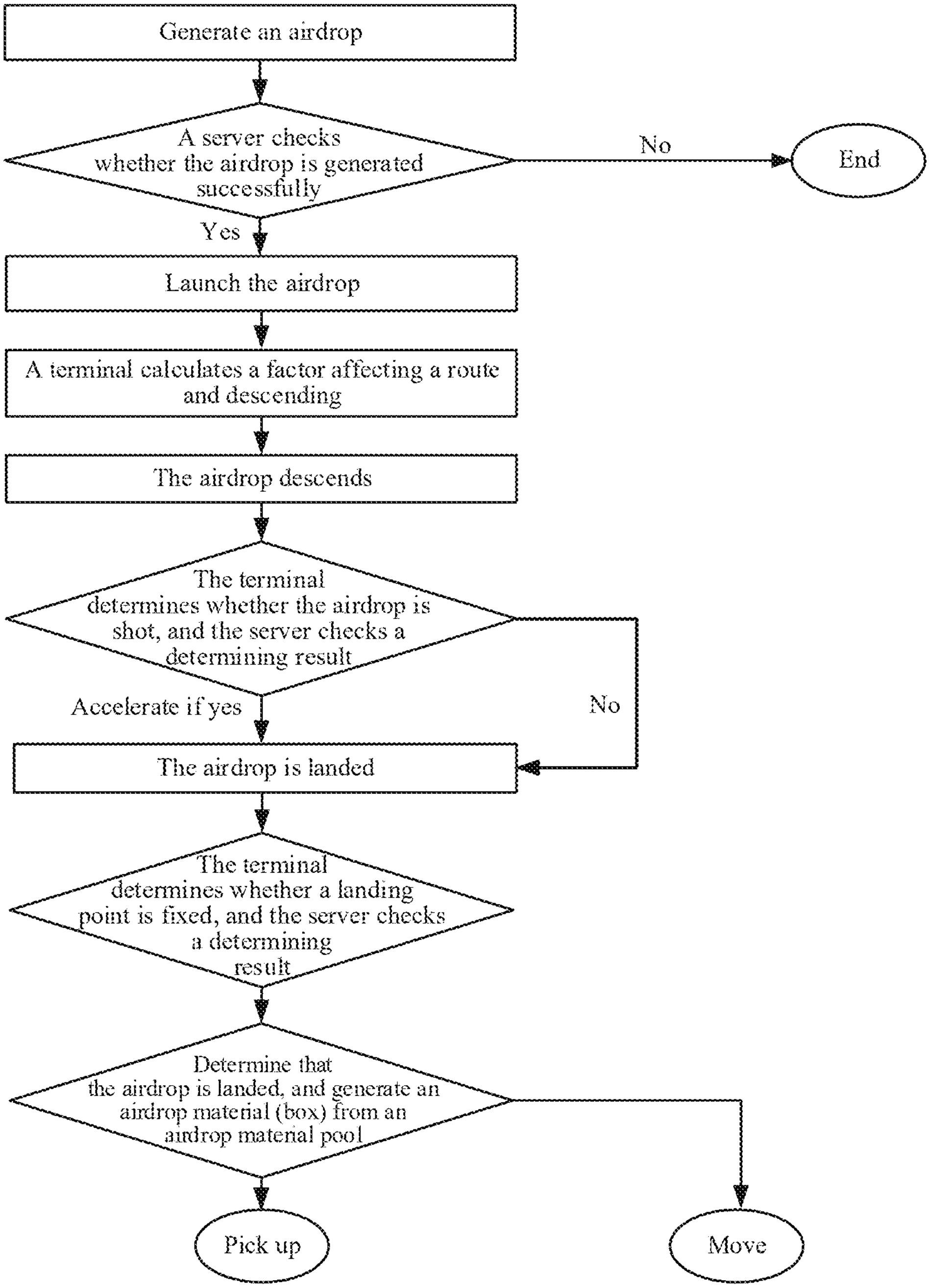
FIG. 8 is a flowchart of a virtual item movement control method according to an embodiment of this application.
Figure 9:
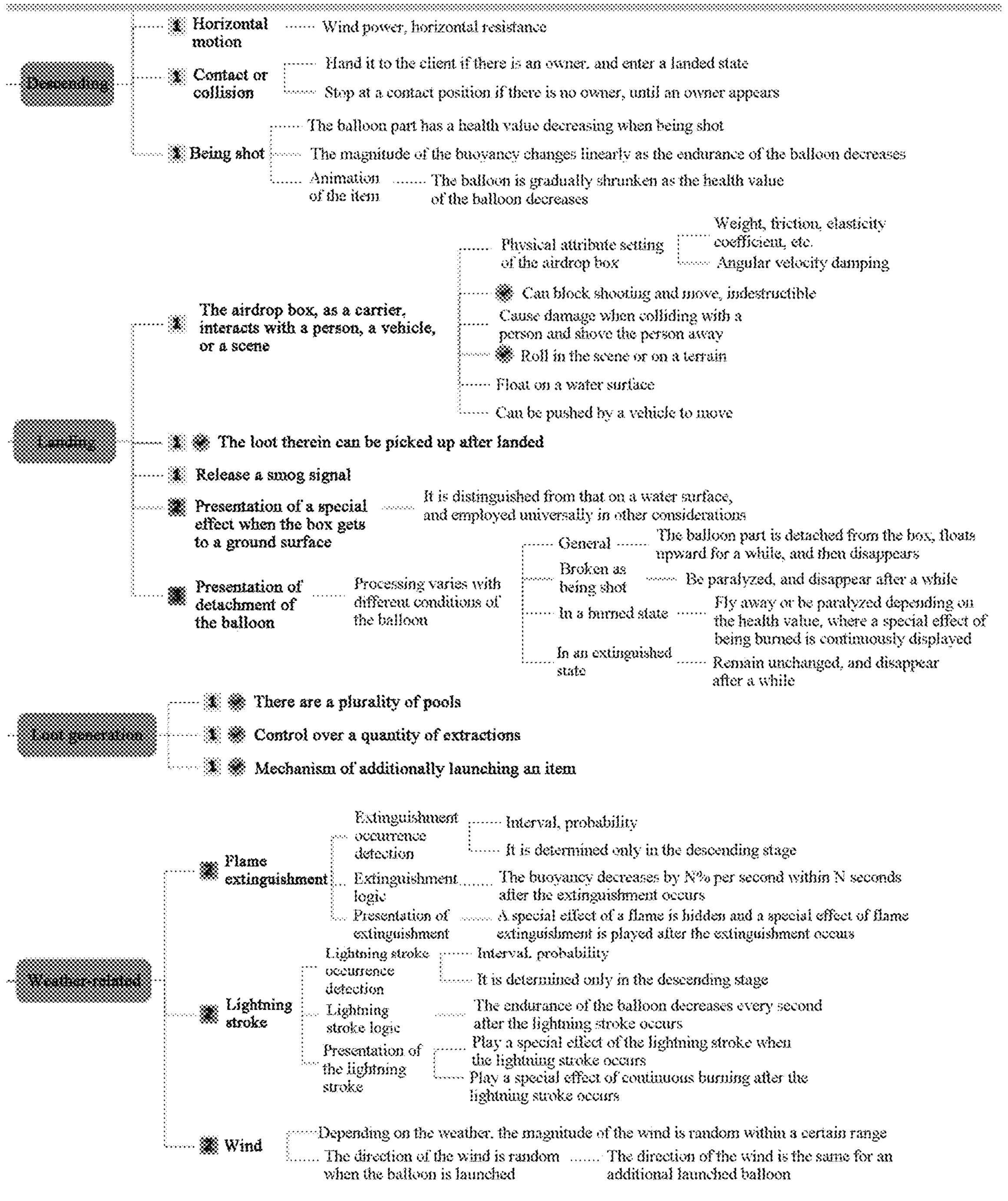
FIG. 9 is a schematic diagram of terminal setting according to an embodiment of this application.

The following describes implementation logic and terminal setting in the virtual item movement control process with reference to FIG. 8 and FIG. 9. Referring to FIG. 8, the server may determine whether to generate an airdrop (the target virtual item) in each item display period, and check whether an airdrop is successfully generated. If yes, the terminal may display the airdrop in the virtual scene. The terminal calculates a factor affecting a route and descending, that is, performs corresponding steps 202 and 203; and controls the airdrop to descend, that is, performs corresponding step 204. If no airdrop is successfully generated, it is unnecessary to display an airdrop at this time. In a descending process, the terminal may determine whether the airdrop is shot, that is, whether destruction behavior of a virtual object in the virtual scene to the flying virtual item is detected. If yes, the terminal may control the airdrop to descend at a higher speed. In this case, a health value of the flying virtual item decreases, and buoyancy decreases. If no, the terminal may continue the detection and keep detecting whether the airdrop is landed. The terminal may determine whether a landing point is fixed, that is, determine whether the airdrop may stop on a virtual item or a virtual article at the landing point. If yes, the terminal determines that the airdrop is landed, and generates an airdrop material (box) from an airdrop material pool, that is, obtains a to-be-picked-up rare virtual item. If no, the terminal continues to detect whether the airdrop is landed. When the terminal determines whether the landing point is fixed, the server also checks a determining result of the terminal. If a check result is that the determining is correct, the terminal may perform a corresponding step according to the determining result. If the check result is that the determining is incorrect, the server may send calculated data to the terminal, to correct the determining result of the terminal. Subsequently, the user may perform a pick-up operation on the airdrop, or may control a car to move the airdrop.

The terminal setting may be shown in FIG. 9. For example, the flying virtual item is a hot air balloon. The target virtual item may include a descending state and a landed state. In a descending process, how to change a movement track may be determined based on a factor such as weather or being shot, and a corresponding animation may be displayed. In the setting, loot generation is obtaining a to-be-picked-up rare virtual item, a loot is a resource or a material, that is, a virtual item. In the landed state, an airdrop may interact with the outside, for which different animations are displayed correspondingly. Details are not repeated herein.

In an embodiment, in the foregoing process, the rare virtual item may alternatively be obtained before step 201, so that when determining the target movement track of the target virtual item, the terminal may further consider a weight of the rare virtual item. Different rare virtual items may have different weights, which is not limited in this embodiment of this application.

In this embodiment of this application, the target movement track of the target virtual item is determined by analyzing impact to the movement track of the target virtual item from at least one of the following two dimensions: the environmental condition of the target virtual item in the virtual scene, or the health value of the flying virtual item in the target virtual item and used for hanging the carrier virtual item, to control the target virtual item to move according to the target movement track. The target movement track obtained in the foregoing process considers the environmental condition or the health value of the flying virtual item, rather than uses a fixed movement track, which can realistically simulate a real scene in which a flying object changes a route due to impact of an environmental factor or a fuel quantity or a health degree of the flying object, and improve the display efficiency and the display effect of the virtual item.

All the foregoing optional technical solutions may be arbitrarily combined to form an optional embodiment of this application, and details are not repeated one by one herein.

Figure 10:
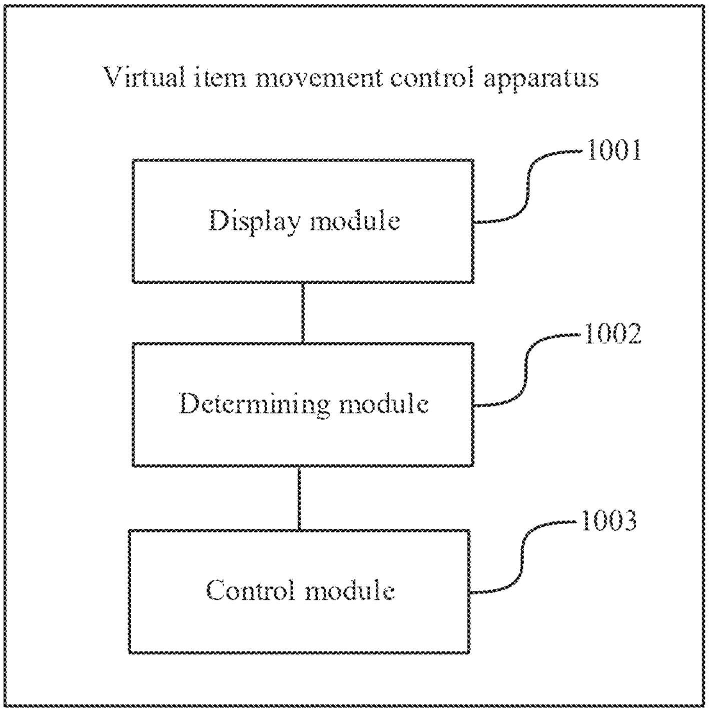
FIG. 10 is a schematic structural diagram of a virtual item movement control apparatus according to an embodiment of this application.

FIG. 10 is a schematic structural diagram of a virtual item movement control apparatus according to an embodiment of this application. Referring to FIG. 10, the apparatus may include:

a display module 1001, configured to display a target virtual item in a virtual scene, the target virtual item including a flying virtual item and a carrier virtual item, and the flying virtual item being used for hanging the carrier virtual item to descend in the virtual scene;

a determining module 1002, configured to determine a target movement track of the target virtual item according to a first display position and a first speed of the target virtual item and at least one of an environmental condition of the virtual scene and a health value of the flying virtual item; and a control module 1003, configured to control the target virtual item to move in the virtual scene according to the target movement track.

In an embodiment, the determining module 1002 is configured to: determine the target movement track of the target virtual item according to the first display position and the first speed of the target virtual item and the environmental condition of the virtual scene; or determine the target movement track of the target virtual item according to the first display position and the first speed of the target virtual item and the health value of the flying virtual item; or determine the target movement track of the target virtual item according to the first display position and the first speed of the target virtual item, the environmental condition of the virtual scene, and the health value of the flying virtual item.

In an embodiment, the determining module 1002 is configured to:

determine a stress condition of the target virtual item according to at least one of the environmental condition of the virtual scene and the health value of the flying virtual item, the stress condition including wind power, air resistance, buoyancy, and gravity that the target virtual item encounters; and determine the target movement track of the target virtual item according to the first display position, the first speed, and the stress condition.

In an embodiment, the determining module 1002 is configured to:

determine, according to a weight of the target virtual item, the gravity that the target virtual item encounters;

determine, according to a magnitude and a direction of wind power in the virtual scene, the wind power that the target virtual item encounters;

determine, according to the health value of the flying virtual item, the buoyancy that the target virtual item encounters, the buoyancy being positively correlated to the health value; and determine, according to the health value of the flying virtual item and a movement speed of the target virtual item, the air resistance that the target virtual item encounters.

In an embodiment, the apparatus further includes:

an adjustment module, configured to decrease the health value of the flying virtual item according to a weather condition in the virtual scene, destruction behavior of a virtual object in the virtual scene to the flying virtual item, or a movement duration of the flying virtual item.

In an embodiment, the adjustment module is configured to:

decrease the health value of the flying virtual item with increasing of the movement duration in a case that the weather condition is sunny; or decrease, in a case that the weather condition is raining or is thunder and lightning and it is determined that the flying virtual item changes based on the weather condition, the health value of the flying virtual item over time by using a time point at which the flying virtual item changes as a start point; or decrease, in a case that destruction behavior of a virtual object in the virtual scene to the flying virtual item is detected, the health value of the flying virtual item over time by using a time point at which the flying virtual item changes as a start point.

In an embodiment, the determining module 1002 is further configured to determine, according to a preset item change probability at a preset time interval, whether the flying virtual item changes based on the weather condition in a case that the weather condition is raining or is thunder and lightning.

In an embodiment, the display module 1001 is further configured to: display a first animation of the flying virtual item in the virtual scene in a case that the weather condition is raining and it is determined that the flying virtual item changes based on the weather condition, the first animation being used for reflecting a state in which fuel combustion of the flying virtual item is extinguished based on the weather condition; or continuously display a second animation of the flying virtual item in the virtual scene in a case that the weather condition is thunder and lightning and it is determined that the flying virtual item changes based on the weather condition, the second animation being used for reflecting a state in which the flying virtual item is continuously burned based on the weather condition.

In an embodiment, the display module 1001 is further configured to display a third animation of the flying virtual item in the virtual scene, the third animation being used for reflecting that a size of the flying virtual item changes with the health value of the flying virtual item, and the size being positively correlated to the health value.

In an embodiment, the determining module 1002 is further configured to determine that the carrier virtual item is in a landed state in a case that it is detected that a distance between the carrier virtual item and any virtual item in the virtual scene or any virtual article in the virtual scene is less than a distance threshold.

In an embodiment, the display module 1001 is further configured to:

display, according to a type of the any virtual item or the any virtual article, a fourth animation corresponding to the type, the fourth animation being used for reflecting movement of the carrier virtual item after the carrier virtual item is landed; and/or display a fifth animation corresponding to the health value according to the health value of the flying virtual item, the fifth animation being used for reflecting a process of the flying virtual item disappearing in the virtual scene.

The apparatus in this embodiment of this application determines the target movement track of the target virtual item by analyzing impact to the movement track of the target virtual item from at least one of the following two dimensions: the environmental condition of the target virtual item in the virtual scene, or the health value of the flying virtual item in the target virtual item and used for hanging the carrier virtual item, to control the target virtual item to move according to the target movement track. The target movement track obtained in the foregoing process considers the environmental condition or the health value of the flying virtual item, rather than uses a fixed movement track, which can realistically simulate a real scene in which a flying object changes a route due to impact of an environmental factor or a fuel quantity or a health degree of the flying object, and improve the display efficiency and the display effect of the virtual item.

When the virtual item movement control apparatus provided in the foregoing embodiment controls the virtual item to move, only division of the foregoing function modules is used as an example for description. In a practical application, the functions may be allocated to and completed by different function modules according to requirements. That is, an internal structure of the apparatus is divided into different function modules, to complete all or some of the functions described above. In addition, the virtual item movement control apparatus provided in the foregoing embodiment belongs to the same concept as the virtual item movement control method embodiment. For a specific implementation process of the apparatus, refer to the method embodiment. Details are not described herein again.

Figure 11:
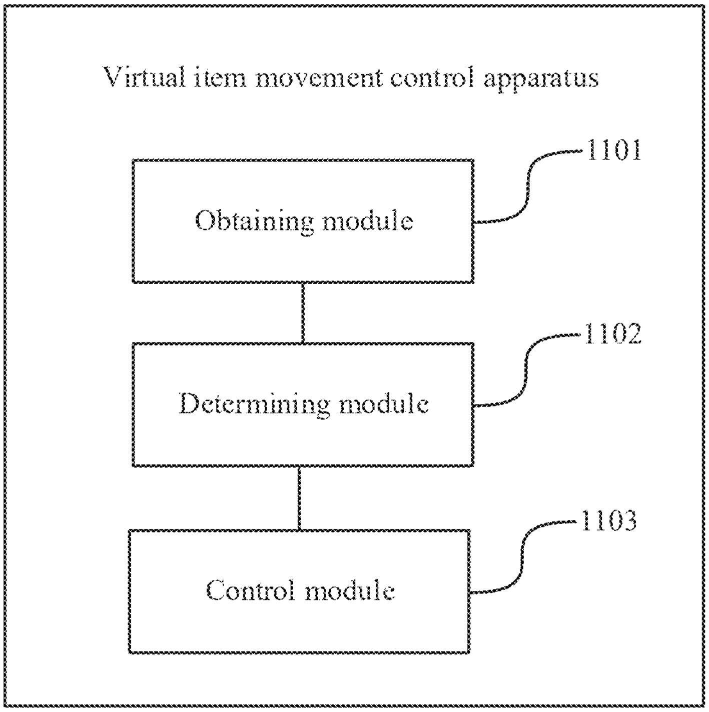
FIG. 11 is a schematic structural diagram of a virtual item movement control apparatus according to an embodiment of this application.

FIG. 11 is a schematic structural diagram of a virtual item movement control apparatus according to an embodiment of this application. Referring to FIG. 11, the apparatus may include:

an obtaining module 1101, configured to obtain a second display position and a second speed of a carrier virtual item in a case that it is determined that the carrier virtual item is in a landed state;

a determining module 1102, configured to determine a target movement track of the carrier virtual item according to the second display position, the second speed, and at least one of a terrain on which the carrier virtual item is located and interaction between the carrier virtual item and a virtual object or a virtual vehicle in a virtual scene; and a control module 1103, configured to control the carrier virtual item to move in the virtual scene according to the target movement track.

In an embodiment, the determining module 1102 is configured to:

determine the target movement track of the carrier virtual item according to the terrain on which the carrier virtual item is located, the second display position, and the second speed; or determine the target movement track of the carrier virtual item according to interaction between the carrier virtual item and a virtual object or a virtual vehicle in the virtual scene, the second display position, and the second speed; or determine the target movement track of the carrier virtual item according to the terrain on which the carrier virtual item is located, interaction between the carrier virtual item and a virtual object or a virtual vehicle in the virtual scene, the second display position, and the second speed.

In an embodiment, the determining module 1102 is configured to:

determine a stress condition of the carrier virtual item according to at least one of the terrain on which the carrier virtual item is located and interaction between the carrier virtual item and a virtual object or a virtual vehicle in the virtual scene, the stress condition including at least one of gravity, support force, buoyancy, friction, or thrust that the carrier virtual item encounters; and determine the target movement track of the carrier virtual item according to the stress condition, the second display position, and the second speed.

In an embodiment, the determining module 1102 is configured to:

in a case that the carrier virtual item is on land and a ground surface on which the carrier virtual item is located is maintained horizontal, determine, according to a weight of the carrier virtual item, the gravity, the support force, and the friction that the carrier virtual item encounters; or in a case that the carrier virtual item is on land and a ground surface on which the carrier virtual item is located is inclined, determine, according to a weight of the carrier virtual item and an inclination angle of the ground surface, the gravity, the support force, and the friction that the carrier virtual item encounters; or in a case that the carrier virtual item is on a water surface, determine, according to a weight of the carrier virtual item or according to a weight of the carrier virtual item and a volume of a part of the carrier virtual item in water, the gravity and the buoyancy that the carrier virtual item encounters; or in a case that the carrier virtual item is on land and it is detected that the virtual object in the virtual scene exerts or the virtual object controls the virtual vehicle to exert thrust to the carrier virtual item, determine, according to a weight of the carrier virtual item and an inclination degree of a ground surface, the gravity, the support force, the thrust, and the friction that the carrier virtual item encounters; or in a case that the carrier virtual item is on a water surface and it is detected that the virtual object in the virtual scene exerts or the virtual object controls the virtual vehicle to exert thrust to the carrier virtual item, determine, according to a weight of the carrier virtual item or according to a weight of the carrier virtual item and a volume of a part of the carrier virtual item in water, the gravity, the buoyancy, the thrust, and the friction that the carrier virtual item encounters.

In an embodiment, a shape of the carrier virtual item is a 32-hedron, and the determining module 1102 is configured to determine a target angular velocity of the carrier virtual item according to the stress condition, the second display position, and the second speed; and correspondingly, the control module 1103 is configured to control the carrier virtual item to roll in the virtual scene according to the target angular velocity.

In an embodiment, the determining module 1102 is further configured to determine, in a case that it is detected that a distance between the carrier virtual item and a virtual object in the virtual scene is less than a distance threshold or a distance between the carrier virtual item and a virtual vehicle controlled by a virtual object in the virtual scene is less than a distance threshold, and a relative speed between the carrier virtual item and the virtual object is greater than a speed threshold, a health damage value of the virtual object according to the relative speed; and the apparatus further includes:

an adjustment module, configured to subtract the health damage value from a health value of the virtual object, to obtain an adjusted health value of the virtual object.

The apparatus in this embodiment of this application determines the target movement track of the carrier virtual item after the carrier virtual item is landed by analyzing impact to the movement track of the carrier virtual item from at least one of the following two dimensions: the terrain on which the carrier virtual item is located and interaction between the carrier virtual item and a virtual object or a virtual vehicle in the virtual scene, to control the carrier virtual item to move according to the target movement track. The target movement track obtained in the foregoing process considers a terrain factor or interaction between the carrier virtual item and the outside, rather than uses a fixed movement track, which can realistically simulate a real scene in which an object slips on a mountain or moves due to thrust from the outside, and improve the display efficiency and the display effect of the virtual item.

When the virtual item movement control apparatus provided in the foregoing embodiment controls the virtual item to move, only division of the foregoing function modules is used as an example for description. In a practical application, the functions may be allocated to and completed by different function modules according to requirements. That is, an internal structure of the apparatus is divided into different function modules, to complete all or some of the functions described above. In addition, the virtual item movement control apparatus provided in the foregoing embodiment belongs to the same concept as the virtual item movement control method embodiment. For a specific implementation process of the apparatus, refer to the method embodiment. Details are not described herein again.

Figure 12:
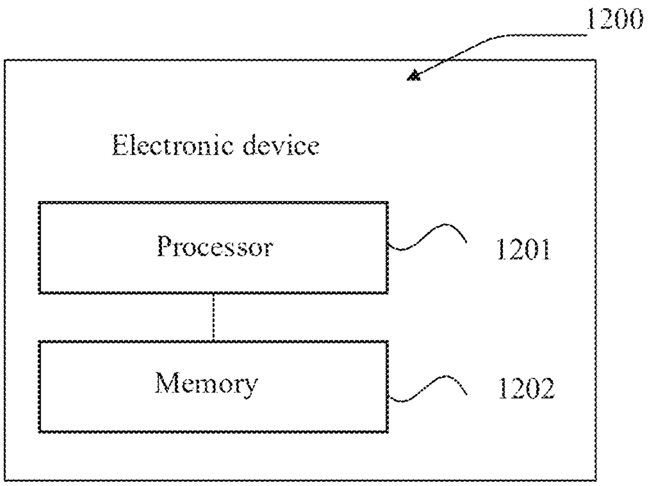
FIG. 12 is a schematic structural diagram of an electronic device according to an embodiment of this application.

FIG. 12 is a schematic structural diagram of an electronic device according to an embodiment of this application. The electronic device 1200 may vary greatly due to different configurations or performance, and may include one or more processors (central processing units (CPUs)) 1201 and one or more memories 1202. The memory 1202 stores at least one instruction. The at least one instruction is loaded and executed by the processor 1201 to implement the virtual item movement control method provided in the method embodiments. Certainly, the electronic device may further include components such as a wired or wireless network interface, a keyboard, and an input/output (I/O) interface, to facilitate input and output. The electronic device may further include another component configured to implement a function of a device. Details are not further described herein.

Figure 13:
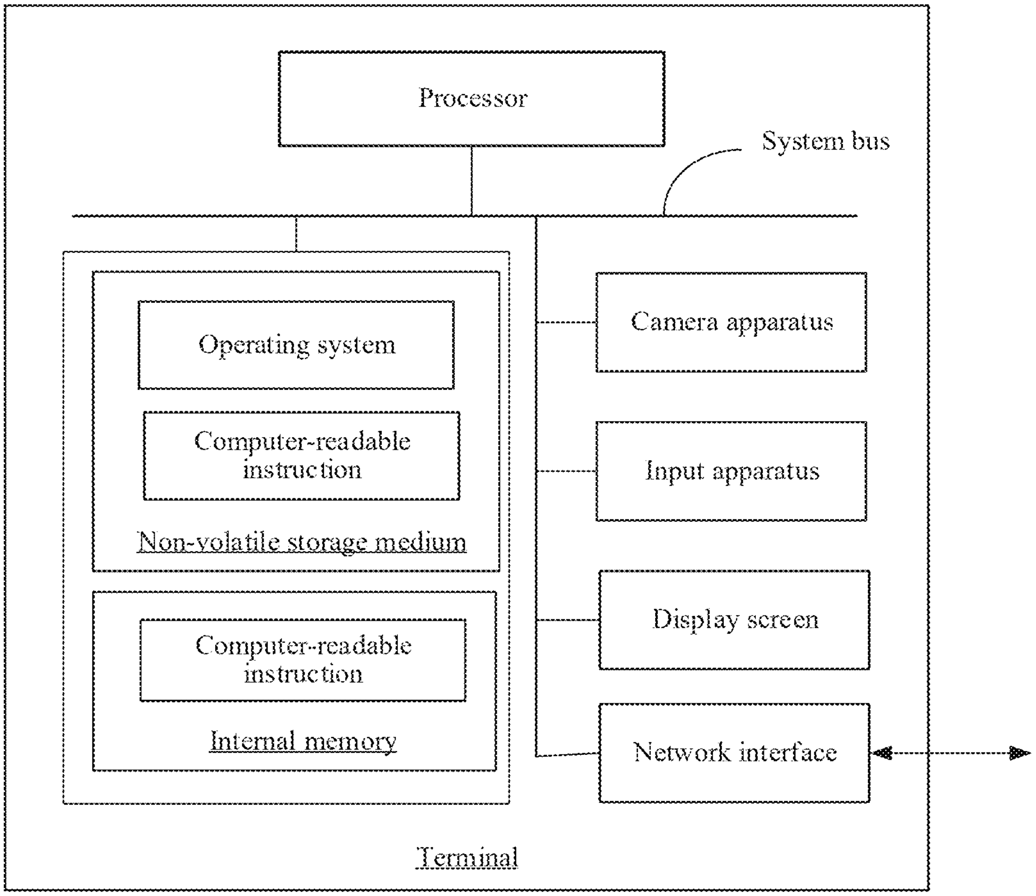
FIG. 13 is a structural block diagram of a terminal according to an embodiment of this application.

FIG. 13 is a diagram of an internal structure of a terminal according to an embodiment. The terminal may be specifically the terminal 110 in FIG. TA. As shown in FIG. 13, the terminal includes a processor, a memory, a network interface, an input apparatus, and a display screen that are connected through a system bus. The memory includes a non-volatile storage medium and an internal memory. The non-volatile storage medium of the terminal stores an operating system, and may further store a computer-readable instruction. The computer-readable instruction, when executed by the processor, may cause the processor to perform the virtual item movement control method. The internal memory may also store a computer-readable instruction. The computer-readable instruction, when executed by the processor, may cause the processor to perform the virtual item movement control method. The display screen of the terminal may be a liquid crystal display screen or an e-ink display screen. The input apparatus of the terminal may be a touch layer covering the display screen, or may be a key, a track ball, or a touchpad disposed on a housing of the terminal, or may be an external keyboard, touchpad, mouse, or the like.

A person of ordinary skill in the art may understand that a structure shown in FIG. 13 is merely a block diagram of a partial structure related to the solution of this application, and does not limit a terminal to which the solution of this application is applied. A specific terminal may include more or fewer parts, combination of some parts, or different part layouts than what is shown in the figure.

In an embodiment, the virtual item movement control apparatus provided in this application may be implemented in the form of a computer-readable instruction, and the computer-readable instruction may run on the terminal shown in FIG. 13. The memory of the terminal may store program modules forming the virtual item movement control apparatus, for example, the display module, the determining module, and the control module shown in FIG. 10, and the obtaining module, the determining module, and the control module shown in FIG. 11. A computer-readable instruction formed by the program modules causes the processor to perform the steps in the virtual item movement control method in the embodiments of this application described in this specification.

For example, the terminal shown in FIG. 13 may use the display module in the virtual item movement control apparatus shown in FIG. 10 to display a target virtual item in a virtual scene, the target virtual item including a flying virtual item and a carrier virtual item, and the flying virtual item being used for hanging the carrier virtual item to descend in the virtual scene. The terminal may use the determining module to determine a target movement track of the target virtual item according to a first display position and a first speed of the target virtual item and at least one of an environmental condition of the virtual scene and a health value of the flying virtual item. The terminal may use the control module to control the target virtual item to move in the virtual scene according to the target movement track.

In another example, the terminal shown in FIG. 13 may use the obtaining module in the virtual item movement control apparatus shown in FIG. 11 to obtain a second display position and a second speed of a carrier virtual item in a case that it is determined that the carrier virtual item is in a landed state. The terminal may use the determining module to determine a target movement track of the carrier virtual item according to the second display position, the second speed, and at least one of a terrain on which the carrier virtual item is located and interaction between the carrier virtual item and a virtual object or a virtual vehicle in a virtual scene. The terminal may use the control module to control the carrier virtual item to move in the virtual scene according to the target movement track.

In an embodiment, a terminal is provided, including a memory and a processor, the memory storing a computer-readable instruction, the computer-readable instruction, when executed by the processor, causing the processor to perform steps of the virtual item movement control method. Herein, the steps of the virtual item movement control method may be the steps of the virtual item movement control method in the foregoing embodiments.

In an embodiment, a computer-readable storage medium is provided, storing a computer-readable instruction, the computer-readable instruction, when executed by a processor, causing the processor to perform steps of the virtual item movement control method. Herein, the steps of the virtual item movement control method may be the steps of the virtual item movement control method in the foregoing embodiments.

A person of ordinary skill in the art may understand that some or all procedures in the methods in the foregoing embodiments may be implemented by a computer-readable instruction instructing related hardware, the program may be stored in a non-volatile computer readable storage medium, and when the program is executed, the procedures in the foregoing method embodiments may be implemented. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features of the embodiments described above may be combined in any way. For brevity of description, possible combinations of the technical features in the foregoing embodiments are not exhausted, which, however, are to be considered as falling within the scope of this specification as long as there is no contradiction in the combinations of these technical features.

The foregoing embodiments show only several implementations of this application and are described in detail, which, however, are not to be construed as a limitation to the patent scope of this application. A person of ordinary skill in the art may further make several variations and improvements without departing from the ideas of this application, and such variations and improvements fall within the protection scope of this application. Therefore, the protection scope of this patent application is subject to the protection scope of the appended claims.

What is claimed is:

1. A method for controlling movement of a virtual item in a virtual scene performed at a computing device, comprising:

displaying a target virtual item to descend in a virtual scene;

determining an initial movement track of the target virtual item according to a first display position and a first speed of the target virtual item;

updating, in real time, the initial movement track of the target virtual item according to at least one of a randomly-determined environmental condition of the virtual scene and a health value of the target virtual item to obtain a target movement track; and controlling the target virtual item to move in the virtual scene according to the target movement track until after the target virtual item arrives at a stationary position in the virtual scene.

2. The method according to claim 1, wherein the updating, in real time, the initial movement track of the target virtual item according to at least one of a randomly-determined environmental condition of the virtual scene and a health value of the target virtual item to obtain a target movement track comprises:

determining a stress condition of the target virtual item, the stress condition comprising wind power, air resistance, buoyancy, and gravity that the target virtual item encounters, at least one of which is a randomly-determined factor in real time; and updating the target movement track of the target virtual item according to the stress condition.

3. The method according to claim 2, wherein the determining a stress condition of the target virtual item comprises at least one of:

determining the gravity that the target virtual item encounters according to a weight of the target virtual item;

determining the wind power that the target virtual item encounters according to a magnitude and a direction of wind power in the virtual scene;

determining the buoyancy that the target virtual item encounters according to the health value of the target virtual item; and determining the air resistance that the target virtual item encounters according to the health value of the target virtual item and a movement speed of the target virtual item.

4. The method according to claim 3, further comprising:

decreasing the health value of the target virtual item according to a weather condition in the virtual scene, destruction behavior of a virtual object in the virtual scene to the target virtual item, or a movement duration of the target virtual item.

5. The method according to claim 4, wherein the decreasing the health value of the target virtual item according to a weather condition in the virtual scene, destruction behavior of a virtual object in the virtual scene to the target virtual item, or a movement duration of the target virtual item comprises:

decreasing the health value of the target virtual item over time by using a time point at which the target virtual item changes as a start point.

6. The method according to claim 1, wherein the method further comprises:

displaying a third animation of the target virtual item in the virtual scene, the third animation indicating that a size of the target virtual item changes with the health value of the target virtual item.

7. The method according to claim 1, wherein the target virtual item includes a payload virtual item, and the method further comprises:

determining that the payload virtual item is in a landed state when a distance between the payload virtual item and any virtual item in the virtual scene or any virtual article in the virtual scene is less than a distance threshold.

8. A computing device, comprising a memory and a processor, the memory storing a plurality of programs, the plurality of programs, when executed by the processor, causing the computing device to perform a method for controlling movement of a virtual item in a virtual scene including:

displaying a target virtual item to descend in a virtual scene;

determining an initial movement track of the target virtual item according to a first display position and a first speed of the target virtual item;

updating, in real time, the initial movement track of the target virtual item according to at least one of a randomly-determined environmental condition of the virtual scene and a health value of the target virtual item to obtain a target movement track; and controlling the target virtual item to move in the virtual scene according to the target movement track until after the target virtual item arrives at a stationary position in the virtual scene.

9. The computing device according to claim 8, wherein the updating, in real time, the initial movement track of the target virtual item according to at least one of a randomly-determined environmental condition of the virtual scene and a health value of the target virtual item to obtain a target movement track comprises:

determining a stress condition of the target virtual item, the stress condition comprising wind power, air resistance, buoyancy, and gravity that the target virtual item encounters, at least one of which is a randomly-determined factor in real time; and updating the target movement track of the target virtual item according to the stress condition.

10. The computing device according to claim 9, wherein the determining a stress condition of the target virtual item comprises at least one of:

determining the gravity that the target virtual item encounters according to a weight of the target virtual item;

determining the wind power that the target virtual item encounters according to a magnitude and a direction of wind power in the virtual scene;

determining the buoyancy that the target virtual item encounters according to the health value of the target virtual item; and determining the air resistance that the target virtual item encounters according to the health value of the target virtual item and a movement speed of the target virtual item.

11. The computing device according to claim 10, wherein the method further comprises:

decreasing the health value of the target virtual item according to a weather condition in the virtual scene, destruction behavior of a virtual object in the virtual scene to the target virtual item, or a movement duration of the target virtual item.

12. The computing device according to claim 11, wherein the decreasing the health value of the target virtual item according to a weather condition in the virtual scene, destruction behavior of a virtual object in the virtual scene to the target virtual item, or a movement duration of the target virtual item comprises:

decreasing the health value of the target virtual item over time by using a time point at which the target virtual item changes as a start point.

13. The computing device according to claim 8, wherein the method further comprises:

displaying a third animation of the target virtual item in the virtual scene, the third animation indicating that a size of the target virtual item changes with the health value of the target virtual item.

14. The computing device according to claim 8, wherein the target virtual item includes a payload virtual item, and the method further comprises:

determining that the payload virtual item is in a landed state when a distance between the payload virtual item and any virtual item in the virtual scene or any virtual article in the virtual scene is less than a distance threshold.

15. A non-transitory computer-readable storage medium, storing a plurality of programs that, when executed by a processor of a computing device, cause the computing device to perform a method for controlling movement of a virtual item in a virtual scene including:

displaying a target virtual item to descend in a virtual scene;

determining an initial movement track of the target virtual item according to a first display position and a first speed of the target virtual item;

updating, in real time, the initial movement track of the target virtual item according to at least one of a randomly-determined environmental condition of the virtual scene and a health value of the target virtual item to obtain a target movement track; and controlling the target virtual item to move in the virtual scene according to the target movement track until after the target virtual item arrives at a stationary position in the virtual scene.

16. The non-transitory computer-readable storage medium according to claim 15, wherein the updating, in real time, the initial movement track of the target virtual item according to at least one of a randomly-determined environmental condition of the virtual scene and a health value of the target virtual item to obtain a target movement track comprises:

determining a stress condition of the target virtual item, the stress condition comprising wind power, air resistance, buoyancy, and gravity that the target virtual item encounters, at least one of which is a randomly-determined factor in real time; and updating the target movement track of the target virtual item according to the stress condition.

17. The non-transitory computer-readable storage medium according to claim 15, wherein the decreasing the health value of the target virtual item according to a weather condition in the virtual scene, destruction behavior of a virtual object in the virtual scene to the target virtual item, or a movement duration of the target virtual item comprises:

decreasing the health value of the target virtual item over time by using a time point at which the target virtual item changes as a start point.

18. The non-transitory computer-readable storage medium according to claim 15, wherein the method further comprises:

displaying a third animation of the target virtual item in the virtual scene, the third animation indicating that a size of the target virtual item changes with the health value of the target virtual item.

19. The non-transitory computer-readable storage medium according to claim 15, wherein the target virtual item includes a payload virtual item, and the method further comprises:

determining that the payload virtual item is in a landed state when a distance between the payload virtual item and any virtual item in the virtual scene or any virtual article in the virtual scene is less than a distance threshold.

20. The non-transitory computer-readable storage medium according to claim 15, wherein the method further comprises:

determining that the payload virtual item is in a landed state when a distance between the payload virtual item and any virtual item in the virtual scene or any virtual article in the virtual scene is less than a distance threshold.

* * * * *